(12) United States Patent
Yokota et al.

(10) Patent No.: US 11,565,724 B2
(45) Date of Patent: Jan. 31, 2023

(54) OPERATION DEVICE AND VEHICLE CONTROL SYSTEM

(71) Applicant: TOYOTA JIDOSHA KABUSHIKI KAISHA, Toyota (JP)

(72) Inventors: Yusuke Yokota, Susono (JP); Atsushi Hanawa, Miyoshi (JP); Yasuki Nakagawa, Toyota (JP); Makoto Matsushita, Ichinomiya (JP); Tomoyuki Kuriyama, Hadano (JP); Tae Sugimura, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 160 days.

(21) Appl. No.: 16/914,576

(22) Filed: Jun. 29, 2020

(65) Prior Publication Data
US 2021/0016797 A1  Jan. 21, 2021

(30) Foreign Application Priority Data
Jul. 16, 2019 (JP) .............................. JP2019-131389

(51) Int. Cl.
*B60W 60/00* (2020.01)
*G05D 1/00* (2006.01)
*B60W 40/08* (2012.01)

(52) U.S. Cl.
CPC .......... *B60W 60/005* (2020.02); *B60W 40/08* (2013.01); *B60W 60/0025* (2020.02);
(Continued)

(58) Field of Classification Search
CPC .......... B60W 60/005; B60W 60/0025; B60W 40/08; B60W 2540/221; G05D 1/0022;
(Continued)

(56) References Cited

U.S. PATENT DOCUMENTS

2018/0074490 A1* 3/2018 Park .................... G06Q 20/3224
2018/0196427 A1* 7/2018 Majumdar ............ B60W 40/09
(Continued)

FOREIGN PATENT DOCUMENTS

JP     2006301723 A  * 11/2006
WO     2018/087880 A1    5/2018

OTHER PUBLICATIONS

Machine Translation of JP-2006301723-A (Year: 2006).*

*Primary Examiner* — Nadeem Odeh
(74) *Attorney, Agent, or Firm* — Oliff PLC

(57) ABSTRACT

An operation device including: an operation section configured to receive operation by a remote operator conferred with operation authority to operate a vehicle capable of autonomous driving; a communication section configured to transmit, to the vehicle, operation information for remote driving based on the operation received by the operation section; a memory; and a processor coupled to the memory, the processor being configured to: acquire biometric information regarding the remote operator, determine whether or not a compromised state, in which operation of the vehicle by the remote operator is compromised, has arisen based on the acquired biometric information, and transfer operation authority of the vehicle to another remote operator in a case in which the compromised state has been determined to have arisen.

3 Claims, 10 Drawing Sheets

(52) U.S. Cl.
CPC ......... *G05D 1/0022* (2013.01); *G05D 1/0061* (2013.01); *G05D 1/0088* (2013.01); *B60W 2540/221* (2020.02); *G05D 2201/0213* (2013.01)

(58) Field of Classification Search
CPC ............... G05D 1/0061; G05D 1/0088; G05D 2201/0213
See application file for complete search history.

(56) References Cited

U.S. PATENT DOCUMENTS

| | | | |
|---|---|---|---|
| 2018/0208211 A1* | 7/2018 | Chiba | B60W 50/082 |
| 2019/0265710 A1 | 8/2019 | Kaneko et al. | |
| 2019/0278298 A1* | 9/2019 | Pedersen | G05D 1/0297 |

* cited by examiner

OPERATION DEVICE AND VEHICLE CONTROL SYSTEM

CROSS-REFERENCE TO RELATED APPLICATION

This application is based on and claims priority under 35 USC 119 from Japanese Patent Application No. 2019-131389 filed on Jul. 16, 2019, the disclosure of which is incorporated by reference herein.

BACKGROUND

Technical Field

The present disclosure relates to an operation device enabling remote operation of a vehicle, and a vehicle control system including such an operation device.

Related Art

International Publication (WO) No. 2018/087880 discloses a vehicle controller device including a remotely driven control section that executes remote driving to cause a vehicle to travel based on control information received from equipment operated by a remote operator externally to the vehicle, and a switchover control section that, in cases in which remote driving is being executed by the remotely driven control section, switches from remote driving to manual driving when a state of a vehicle occupant as detected by a detection section is a manual driving execution-enabled state.

In cases in which remote driving by the remote operator becomes compromised while remote driving is in progress but the occupant of the vehicle is unable to perform manual driving, the ability to continue traveling by switching to remote driving by another remote operator would be welcome.

SUMMARY

An object of the present disclosure is to provide an operation device enabling travel of a vehicle to be continued by another remote operator in cases in which remote operation by a remote operator becomes compromised.

A first aspect is an operation device including: an operation section configured to receive operation by a remote operator conferred with operation authority to operate a vehicle capable of autonomous driving; a communication section configured to transmit, to the vehicle, operation information for remote driving based on the operation received by the operation section; a biometric information acquisition section configured to acquire biometric information regarding the remote operator; a determination section configured to determine whether or not a compromised state, in which operation of the vehicle by the remote operator is compromised, has arisen based on the biometric information acquired by the biometric information acquisition section; and a transfer section configured to transfer operation authority of the vehicle to another remote operator in a case in which the determination section has determined that the compromised state has arisen.

In the operation device of the first aspect, the vehicle is capable of being remotely driven by the operation section receiving operation by the remote operator, and the communication section transmitting to the vehicle the operation information for remote driving. In this operation device, in cases in which the determination section has determined that operation of the vehicle by the remote operator is compromised based on the biometric information acquired by the biometric information acquisition section, the transfer section is capable of transferring operation authority of the vehicle to another remote operator.

This operation device enables travel of the vehicle to be continued by the other remote operator in cases in which remote operation by the remote operator has become compromised.

An operation device of a second aspect is the operation device of the first aspect, wherein the transfer section is further configured to hand back operation authority of the vehicle to the vehicle in a case in which another remote operator capable of remotely driving the vehicle is not available when the determination section has determined that the compromised state has arisen.

The operation device of the second aspect enables the vehicle to continue traveling even in cases in which another remote driver cannot be secured while in the compromised state, by being autonomously driven.

An operation device of a third aspect is the operation device of the first or the second aspect, further including a change instruction acquisition section that is capable of acquiring change instruction information in which an occupant of the vehicle instructs a change in remote operator. The transfer section is further configured to transfer operation authority of the vehicle to the other remote operator or to hand back operation authority of the vehicle to the vehicle in a case in which the change instruction acquisition section has acquired the change instruction information.

In the operation device of the third aspect, in cases in which the occupant of the vehicle has instructed a change in the remote operator of the vehicle, the change instruction acquisition section acquires the change instruction information instructing this change. When the change instruction acquisition section has acquired the change instruction information, the transfer section transfers operation authority of the vehicle to the other remote operator, or hands back operation authority of the vehicle to the vehicle. Thus, the operation device enables an alternative to the remote operator to be provided in cases in which the occupant of the vehicle feels uncomfortable about the driving of the remote operator.

A fourth aspect is a vehicle control system including plural of operation devices according to any one of the first to the third aspects, and the vehicle, the vehicle being capable of being remotely driven based on operation information received from one of the operation devices. The vehicle includes a travel control section configured to execute remote driving based on operation information received from an operation device operated by the other remote operator in a case in which the transfer section has transferred operation authority to the other remote operator, and to switch from executing remote driving to executing autonomous driving in a case in which the transfer section has handed back operation authority to the vehicle.

The vehicle control system of the fourth aspect includes the plural operation devices and the vehicle. In the vehicle of this vehicle control system, the travel control section is capable of executing autonomous driving, and of executing remote driving based on operation information received from one of the operation devices. This vehicle control system enables travel of the vehicle to be continued by remote driving by another remote operator or by autonomous driving in cases in which remote operation by the remote operator becomes compromised.

The present disclosure enables travel of the vehicle to be continued by another remote operator in cases in which remote operation by the remote operator becomes compromised.

BRIEF DESCRIPTION OF THE DRAWINGS

Exemplary embodiments to present disclosure will be described in detail based on the following figures, wherein.

DETAILED DESCRIPTION

First Exemplary Embodiment

Figure 1:
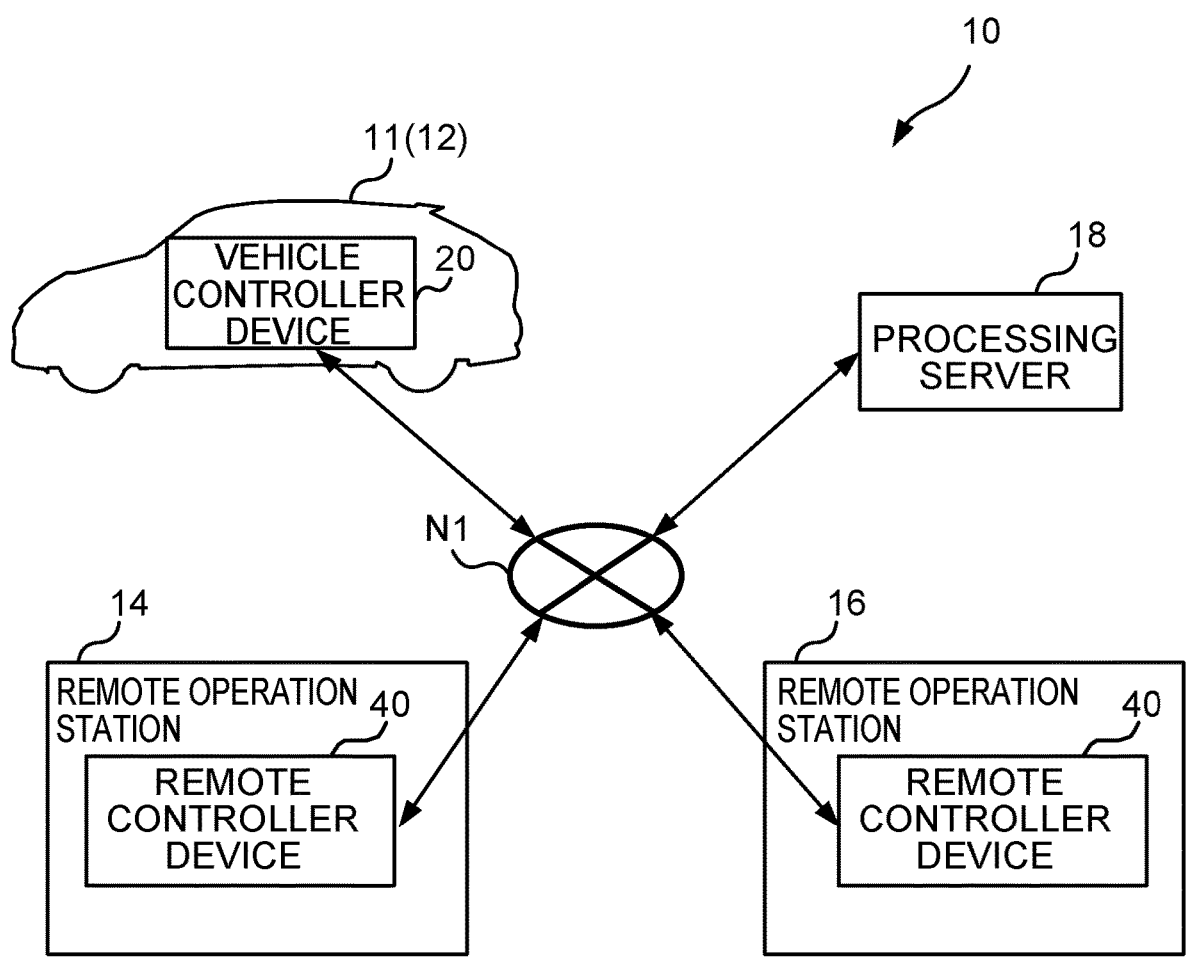
FIG. 1 is a diagram illustrating schematic configuration of a vehicle control system according to a first exemplary embodiment.

FIG. 1 is a block diagram illustrating a schematic configuration of a vehicle control system 10 according to a first exemplary embodiment.

Outline

As illustrated in FIG. 1, the vehicle control system 10 according to the first exemplary embodiment is configured including an autonomous driving-enabled vehicle 11, plural remote operation stations 14, 16, serving as operation devices, and a processing server 18. The autonomous driving-enabled vehicle 11 of the present exemplary embodiment corresponds to a vehicle 12.

The vehicle 12 of the present exemplary embodiment includes a vehicle controller device 20, and the remote operation stations 14 and 16 each include a remote controller device 40. In the vehicle control system 10, the vehicle controller device 20 of the vehicle 12, the remote controller device 40 of the remote operation station 14, and the remote controller device 40 of the remote operation station 16 are connected to one another through a network N1.

Although the vehicle control system 10 in FIG. 1 is configured by the single autonomous driving-enabled vehicle 11 (vehicle 12), and the two remote operation stations 14, 16, the respective numbers thereof are not limited thereto. The vehicle control system 10 may include two or more of the autonomous driving-enabled vehicles 11, and may include three or more of the remote operation stations.

The vehicle 12 is configured so as to be capable of executing autonomous driving in which the vehicle 12 travels independently by the vehicle controller device 20 based on a pre-generated travel plan, remote driving based on operation of the remote operation stations 14, 16 by remote drivers serving as remote operators, and manual driving based on operation by an occupant of the vehicle 12 (namely, a driver).

Autonomous Driving-Enabled Vehicle

Figure 2:
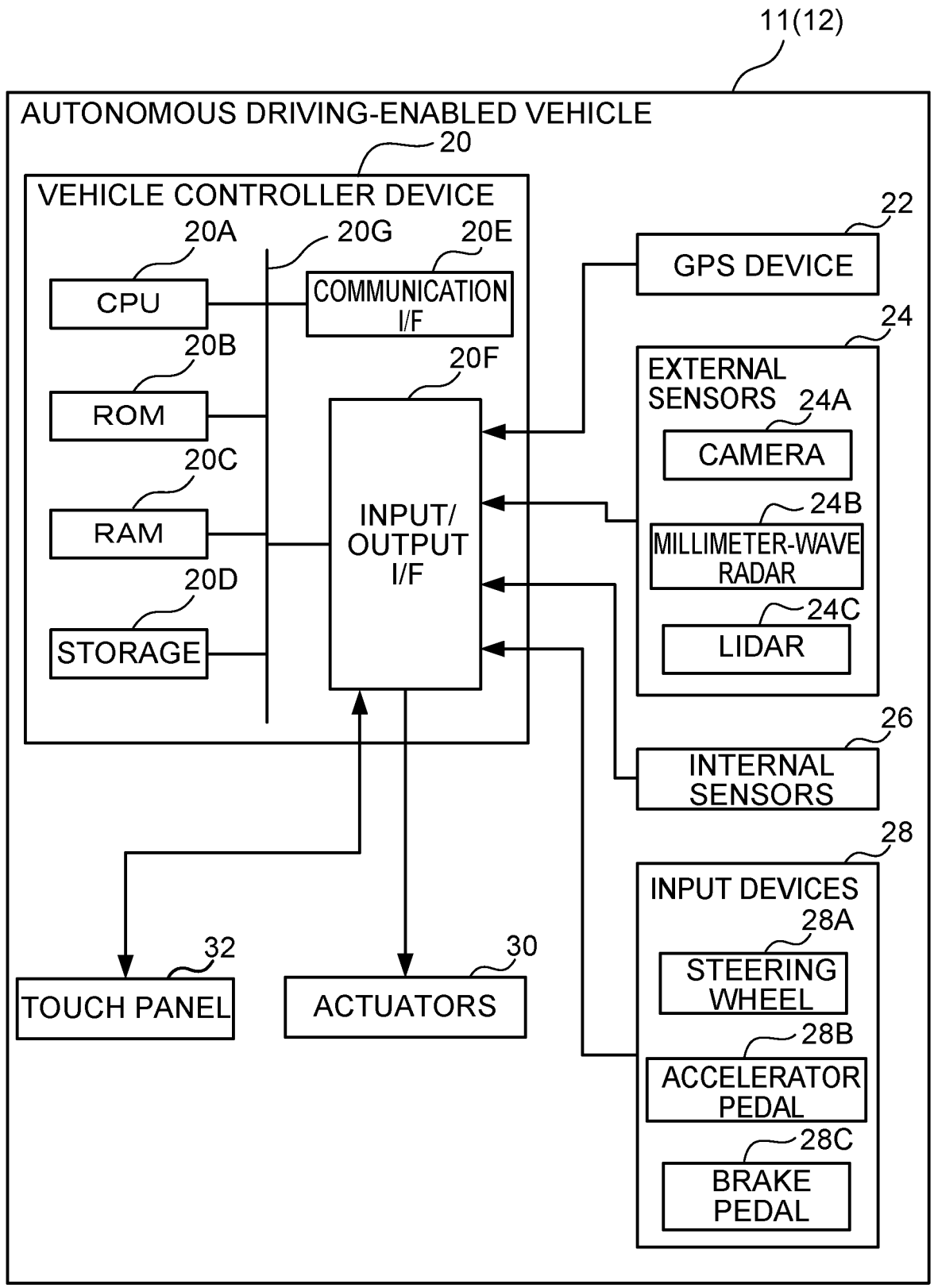
FIG. 2 is a block diagram illustrating hardware configuration of a vehicle of the first exemplary embodiment.

FIG. 2 is a block diagram illustrating hardware configuration of equipment installed in the vehicle 12 of the present exemplary embodiment. In addition to the vehicle controller device 20 described above, the vehicle 12 includes a global positioning system (GPS) device 22, external sensors 24, internal sensors 26, input devices 28, and actuators 30.

The vehicle controller device 20 is configured including a central processing unit (CPU) 20A, read only memory (ROM) 20B, random access memory (RAM) 20C, storage 20D, a communication interface (UF) 20E, and an input/output OF 20F. The CPU 20A, the ROM 20B, the RAM 20C, the storage 20D, the communication OF 20E and the input/output OF 20F are connected together so as to be capable of communicating with each other through a bus 20G.

The CPU 20A is a central processing unit that executes various programs and controls various sections. Namely, the CPU 20A reads a program from the ROM 20B and executes the program, using the RAM 20C as a workspace. In the present exemplary embodiment, an execution program is stored in the ROM 20B. The CPU 20A executes the execution program to cause the vehicle controller device 20 to function as a position acquisition section 200, a peripheral information acquisition section 210, a vehicle information acquisition section 220, a travel plan generation section 230, an operation reception section 240, a travel control section 250, a notification section 260, and a handover section 270, respectively illustrated in FIG. 3.

As illustrated in FIG. 2, the ROM 20B stores various programs and various data. The RAM 20C serves as a workspace to temporarily store the programs or data.

The storage 20D is configured by a hard disk drive (HDD) or a solid state drive (SSD), and stores various programs including an operating system, as well as various data.

The communication OF 20E includes an interface for connecting to the network N1 in order to communicate with the other vehicle controller devices 20, the remote controller device 40, the processing server 18, and so on. A communication protocol such as LTE or Wi-Fi (registered trademark) is employed for this interface.

The communication OF 20E of the present exemplary embodiment transmits images captured by a camera 24A to the remote operation station 14 or 16 external to the vehicle 12 through the network N1, and receives remote operation information, this being operation information to operate the vehicle 12, from the remote operation station 14 or 16.

The input/output I/F 20F is an interface for communicating with the various devices installed in the vehicle 12. The vehicle controller device 20 of the present exemplary embodiment is connected to the GPS device 22, the external sensors 24, the internal sensors 26, the input devices 28, and the actuators 30 through the input/output I/F 20F. Note that the GPS device 22, the external sensors 24, the internal sensors 26, the input devices 28, and the actuators 30 may be directly connected to the bus 20G.

The GPS device 22 is a device for measuring the current position of the vehicle 12. The GPS device 22 includes an antenna to receive signals from GPS satellites.

The external sensors 24 serve as a peripheral information detection section, and are a group of sensors that detect peripheral information from around the periphery of the vehicle 12. The external sensors 24 include the camera 24A that images a predetermined range, millimeter-wave radar 24B that transmits scanning waves over a predetermined range and receives reflected waves, and laser imaging detection and ranging (LIDAR) 24C that scans a predetermined range.

The internal sensors 26 are a group of sensors that detect travel states of the vehicle 12. The internal sensors 26 include at least one out of a vehicle speed sensor, an acceleration sensor, and a yaw rate sensor.

The input devices 28 are a group of switches to be operated by the occupant on board the vehicle 12. The input devices 28 include a steering wheel 28A serving as a switch to steer the steered wheels of the vehicle 12, an accelerator pedal 28B serving as a switch to cause the vehicle 12 to accelerate, and a brake pedal 28C serving as a switch to cause the vehicle 12 to decelerate.

The actuators 30 include a steering wheel actuator to drive the steered wheels of the vehicle 12, an accelerator actuator to control acceleration of the vehicle 12, and a brake actuator to control deceleration of the vehicle 12.

A touch panel 32 is a device used to visually present information to an occupant of the vehicle 12, and to receive operation relating to settings of the vehicle 12. The touch panel 32 is configured by a combination of a liquid crystal display serving as a display device and a touchpad serving as an input device. The touch panel 32 displays text 32A, as illustrated by "REMOTE DRIVING IN PROGRESS" in FIG. 7, to indicate whether the driving state of the vehicle 12 corresponds to manual driving, autonomous driving, or remote driving. The touch panel 32 also displays operation icons used to switch between the driving states and so on. Specifically, these icons include an icon 32B used to switch to manual driving, an icon 32C used to switch to autonomous driving, and an icon 32D used to change remote driver.

Figure 3:
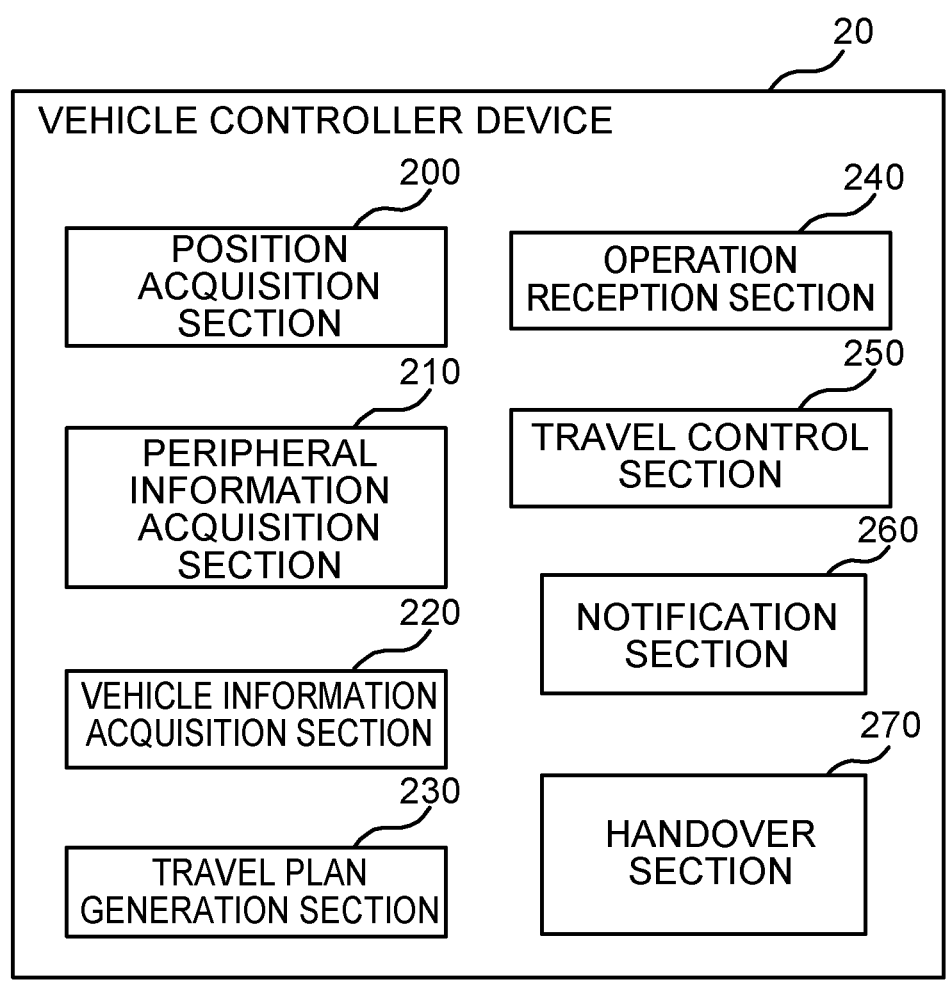
FIG. 3 is a block diagram illustrating an example of functional configuration of a vehicle controller device of the first exemplary embodiment.

FIG. 3 is a block diagram illustrating an example of functional configuration of the vehicle controller device 20. As illustrated in FIG. 3, the vehicle controller device 20 includes the position acquisition section 200, the peripheral information acquisition section 210, the vehicle information acquisition section 220, the travel plan generation section 230, the operation reception section 240, the travel control section 250, the notification section 260, and the handover section 270. Each of the functional configurations is implemented by the CPU 20A reading the execution program stored in the ROM 20B and executing this program.

The position acquisition section 200 includes functionality to acquire the current position of the vehicle 12. The position acquisition section 200 acquires position information from the GPS device 22 through the input/output OF 20F.

The peripheral information acquisition section 210 includes functionality to acquire peripheral information from around the periphery of the vehicle 12. The peripheral information acquisition section 210 acquires peripheral information regarding the vehicle 12 from the external sensors 24 through the input/output OF 20F. The "peripheral information" includes not only information regarding other vehicles and pedestrians in the surroundings of the vehicle 12, but also regarding the weather, brightness, road width, obstacles, and so on.

The vehicle information acquisition section 220 includes functionality to acquire vehicle information such as the vehicle speed, acceleration, yaw rate, and so on of the vehicle 12. The vehicle information acquisition section 220 acquires the vehicle information regarding the vehicle 12 from the internal sensors 26 through the input/output OF 20F.

The travel plan generation section 230 includes functionality to generate a travel plan to cause the vehicle 12 to travel based on the position information acquired by the position acquisition section 200, the peripheral information acquired by the peripheral information acquisition section 210, and the vehicle information acquired by the vehicle information acquisition section 220. The travel plan includes not only a travel route to a pre-set destination, but also information regarding a course to avoid obstacles ahead of the vehicle 12, the speed of the vehicle 12, and so on.

The operation reception section 240 includes functionality to receive signals output from the various input devices 28 when manual driving is being performed based on operation by the occupant of the vehicle 12. The operation reception section 240 also generates vehicle operation information, this being operation information used to control the actuators 30, based on the signals received from the various input devices 28.

The travel control section 250 includes functionality to control autonomous driving based on the travel plan generated by the travel plan generation section 230, to control remote driving based on the remote operation information received from the remote operation station 14 or 16, and to control manual driving based on vehicle operation information received from the operation reception section 240. The travel control section 250 also includes functionality to perform switching processing to switch from remote driving by one remote operation station to remote driving by another remote operation station, and to perform switching processing to switch from remote driving by a remote operation station to autonomous driving in which the vehicle 12 is self-driven.

For example, in cases in which a transfer notification command to transfer operation authority of the vehicle 12 to a remote driver at the remote operation station 16 is acquired during remote driving by the remote operation station 14, the travel control section 250 executes switching processing to switch to remote driving by the remote operation station 16. As another example, in cases in which an authority transfer command to hand back operation authority from the remote operation station 14 to the vehicle 12 is acquired, the travel control section 250 executes switching processing to switch from remote driving to autonomous driving.

The notification section 260 includes functionality to notify the remote operation station 14 or 16 of operation received through the touch panel 32 that relates to changing remote driver. For example, in cases in which a remote driver change has been instructed by the occupant using the touch panel 32 during remote driving, the notification section 260 transmits change instruction information to instruct a remote driver change to the remote operation station 14 or 16 through the input/output OF 20F.

The handover section 270 includes functionality to transfer operation authority, this being authority to operate the vehicle 12 installed with the vehicle controller device 20, to the remote driver at the remote operation station 14 or 16. When conferring operation authority for the vehicle 12 on the remote driver at the remote operation station 14 or 16, the vehicle controller device 20 transmits an authority transfer command to the remote operation station 14 or 16. When operation authority is transferred to a remote driver, the travel control section 250 of the vehicle 12 causes the vehicle 12 to travel based on remote operation information received from the corresponding remote operation station 14 or 16. Namely, remote driving is performed.

Remote Operation Station

Figure 4:
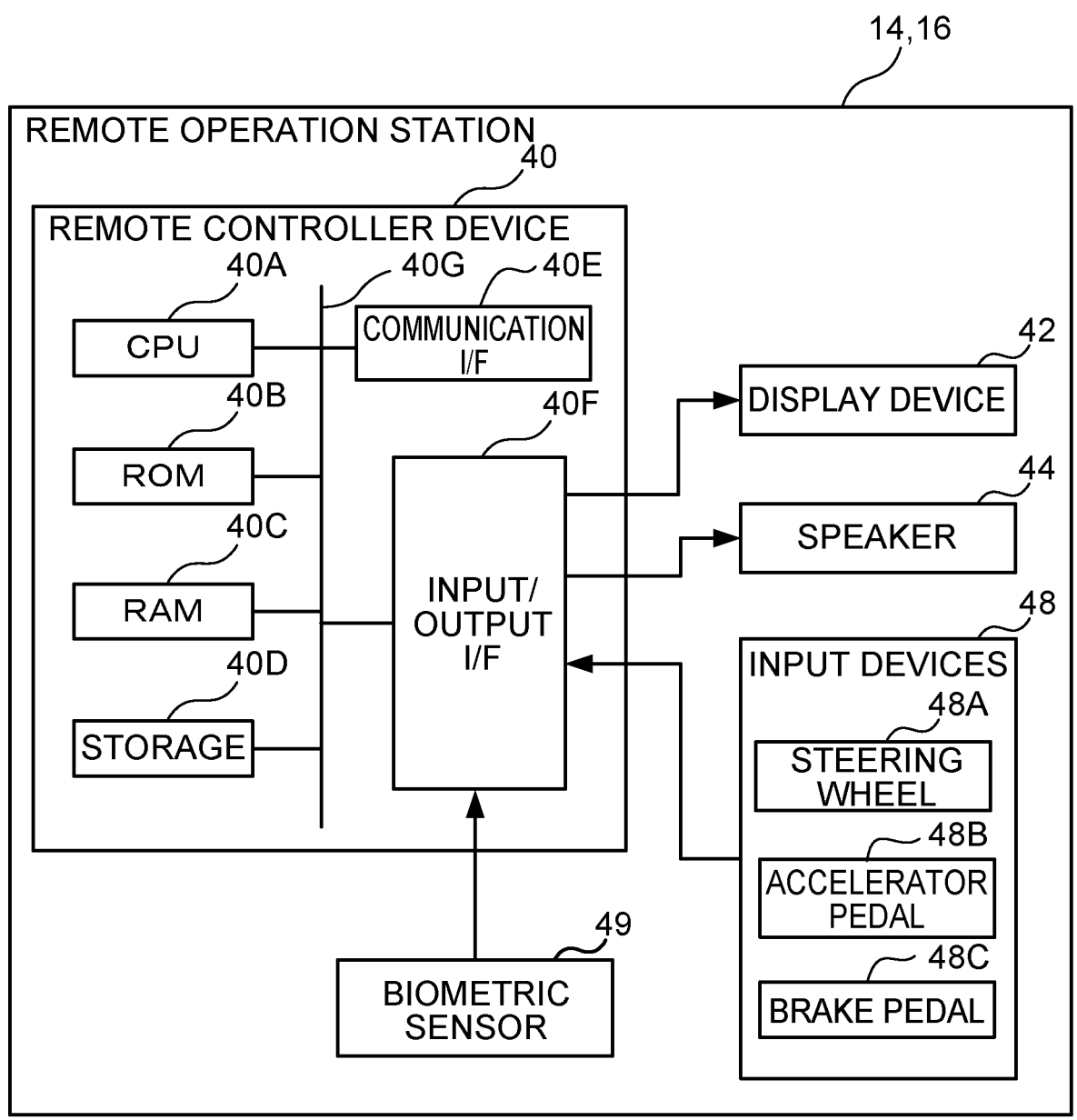
FIG. 4 is a block diagram illustrating hardware configuration of a remote operation station of the first exemplary embodiment.

FIG. 4 is a block diagram illustrating hardware configuration of equipment installed in the remote operation station 14 of the present exemplary embodiment. Note that although the following explanation relates to the remote operation station 14, the remote operation station 16 is configured and functions similarly to the remote operation station 14. The remote operation station 14 includes the remote controller device 40 described above, as well as a display device 42, a speaker 44, input devices 48 serving as operation sections, and a biometric sensor 49.

The remote controller device 40 is configured including a CPU 40A, ROM 40B, RAM 40C, storage 40D, a communication I/F 40E and an input/output I/F 40F. The CPU 40A, the ROM 40B, the RAM 40C, the storage 40D, the communication I/F 40E, and the input/output I/F 40F are connected together so as to be capable of communicating with each other through a bus 40G Functionality of the CPU 40A, the ROM 40B, the RAM 40C, the storage 40D, the communication I/F 40E, and the input/output I/F 40F matches that of the CPU 20A, the ROM 20B, the RAM 20C, the storage 20D, the communication I/F 20E, and the input/output I/F 20F of the vehicle controller device 20 previously described. Note that the communication I/F 40E corresponds to a communication section. The CPU 40A is an example of a processor, and the RAM 40C is an example of memory.

Figure 5:
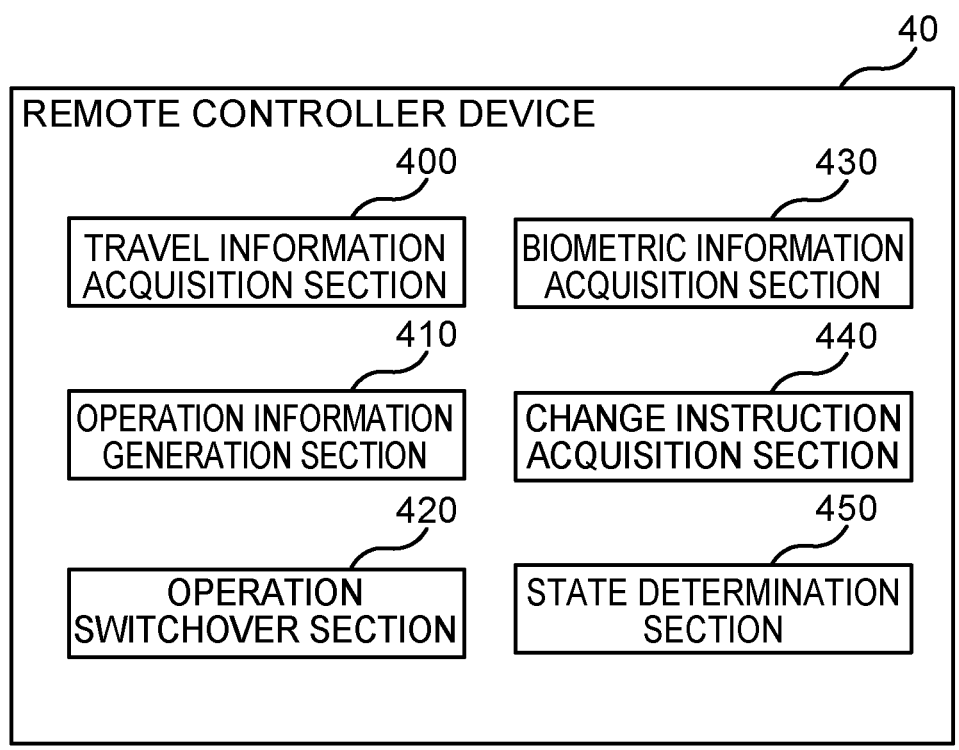
FIG. 5 is a block diagram illustrating an example of functional configuration of a remote controller device of the first exemplary embodiment.

The CPU 40A reads a program from the ROM 40B and executes the program, using the RAM 40C as a workspace. In the present exemplary embodiment, a processing program is stored in the ROM 40B. When the CPU 40A executes the processing program, the remote controller device 40 functions as a travel information acquisition section 400, an operation information generation section 410, an operation switchover section 420, a biometric information acquisition section 430, a change instruction acquisition section 440, and a state determination section 450, as illustrated in FIG. 5.

In the remote controller device 40 of the present exemplary embodiment, the display device 42, the speaker 44, the input devices 48, and the biometric sensor 49 are connected together through the input/output I/F 40F. Note that the display device 42, the speaker 44, the input devices 48, and the biometric sensor 49 may be directly connected to the bus 40G.

The display device 42 is a liquid crystal monitor for displaying an image captured by the camera 24A of the vehicle 12 and various information relating to the vehicle 12.

The speaker 44 is a speaker for replaying audio recorded by a microphone attached to the camera 24A of the vehicle 12 together with the captured image.

The input devices 48 are controllers to be operated by the remote driver serving as a remote operator using the remote operation station 14. The input devices 48 include a steering wheel 48A serving as a switch to steer the steered wheels of the vehicle 12, an accelerator pedal 48B serving as a switch to cause the vehicle 12 to accelerate, and a brake pedal 48C serving as a switch to cause the vehicle 12 to decelerate. Note that the implementation of the respective input devices 48 is not limited thereto. For example, a lever switch may be provided instead of the steering wheel 48A. As another example, push button switches or lever switches may be provided instead of the pedal switches of the accelerator pedal 48B and the brake pedal 48C.

The biometric sensor 49 is a sensor to acquire biometric information regarding the remote driver using the remote operation station 14. Examples of the biometric sensor 49 include known sensors such as a pulse sensor, a body temperature sensor, a body pressure sensor, a motion sensor, a gaze detection camera, or an activity monitor.

FIG. 5 is a block diagram illustrating an example of functional configuration of the remote controller device 40. As illustrated in FIG. 5, the remote controller device 40 includes the travel information acquisition section 400, the operation information generation section 410, the operation switchover section 420, the biometric information acquisition section 430, the change instruction acquisition section 440, and the state determination section 450.

The travel information acquisition section 400 includes functionality to acquire audio as well as captured images from the camera 24A transmitted by the vehicle controller device 20, and vehicle information such as the vehicle speed. The acquired captured image and vehicle information are displayed on the display device 42 and the audio information is output through the speaker 44.

The operation information generation section 410 includes functionality to receive signals output from the various input devices 48 when remote driving is being performed based on operation by the remote driver. The operation information generation section 410 also generates remote operation information to be transmitted to the vehicle controller device 20 based on the signals received from the various input devices 48.

The operation switchover section 420 serves as a transfer section, and includes functionality to control switching of remote driving of the vehicle 12. Specifically, the operation switchover section 420 executes processing such that remote driving of the vehicle 12 is performed when an authority transfer command has been acquired from the vehicle 12 or from another remote operation station (for example the remote operation station 16). The operation switchover section 420 also executes determination processing, as well as executing processing to switch remote driving by a remote operation station to remote driving by another remote operation station or to switch to autonomous driving by the vehicle 12, in response to results of this determination processing. The determination processing is determination to decide whether to transfer operation authority of the vehicle 12 to another remote operation station or to hand back operation authority to the vehicle 12 in cases in which the change instruction acquisition section 440 has acquired change instruction information, described later, or in cases in which the state determination section 450 has determined a compromised state, described later, to have arisen.

For example, in a case in which a decision is made to transfer the operation authority of the vehicle 12 to the remote operation station 16 during remote driving by the remote operation station 14, the operation switchover section 420 of the remote operation station 14 transmits an authority transfer command to the remote operation station 16, and transmits a transfer notification command to the vehicle controller device 20 of the vehicle 12. The operation switchover section 420 then executes end processing to end remote operation relating to the remote driving of the vehicle 12. As another example, when a decision is made to hand back operation authority of the vehicle 12 to the vehicle 12 during remote driving by the remote operation station 14, the operation switchover section 420 transmits an authority transfer command to the vehicle controller device 20 of the vehicle 12. The operation switchover section 420 then executes end processing to end remote operation relating to the remote driving of the vehicle 12.

The biometric information acquisition section 430 includes functionality to acquire biometric information regarding the remote driver detected by the biometric sensor 49. The biometric information acquisition section 430 converts the biometric information acquired from the biometric sensor 49 into a predetermined physical quantity and stores this in the ROM 40B, the RAM 40C, or the storage 40D.

The change instruction acquisition section 440 includes functionality to acquire change instruction information instructing a remote driver change from the vehicle controller device 20 of the vehicle 12. The change instruction information is generated by the vehicle controller device 20 of the vehicle 12 and is acquired from the vehicle controller device 20 through the communication OF 40E.

The state determination section 450 serves as a determination section, and includes functionality to perform state determination whether or not a compromised state in which operation of the vehicle 12 by the remote driver is comprised has arisen based on the biometric information acquired from the biometric sensor 49. As this state determination, for example, the state determination section 450 may determine that the compromised state has arisen in cases in which the pulse rate acquired by a pulse sensor configuring the biometric sensor 49 or a blood pressure value acquired from a blood pressure sensor configuring the biometric sensor 49 exceeds or is below a predetermined threshold. As another example, the state determination section 450 may determine that the compromised state has arisen in cases in which the posture of the remote driver has diverged from a normal driving posture using a motion sensor or body pressure sensor configuring the biometric sensor 49. As another example, the state determination section 450 may determine that the compromised state has arisen in cases in which movement of the gaze of the remote driver with respect to the display device 42 is more pronounced than usual using a camera configuring the biometric sensor 49.

Control Flow

In the present exemplary embodiment, in cases in which the remote operation station 14 is remotely driving the vehicle 12, processing is executed to switch to remote driving by the remote operation station 16 or to autonomous driving by the vehicle 12 in cases in which a predetermined condition has been met. Explanation follows regarding a flow of such processing between the respective devices, with reference to the sequence diagram of FIG. 6.

Figure 6:
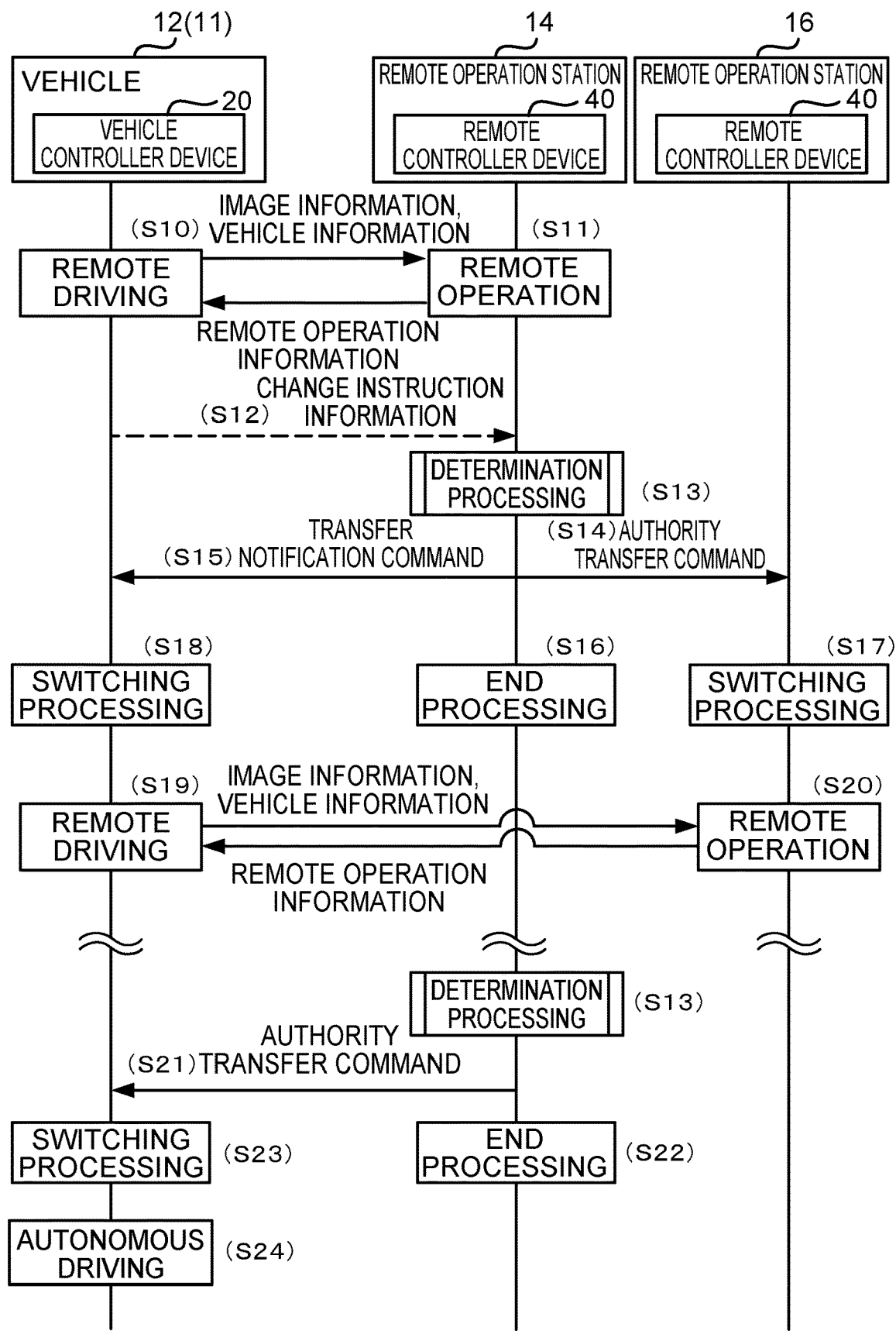
FIG. 6 is a sequence diagram illustrating a flow of processing between respective devices in the first exemplary embodiment.

At step S10 in FIG. 6, the CPU 20A of the vehicle controller device 20 of the vehicle 12 executes remote driving. At the same time, at step S11 the CPU 40A of the remote controller device 40 of the remote operation station 14 executes remote operation. Namely, the remote operation station 14 receives images captured by the camera 24A and vehicle information from the internal sensors 26 from the vehicle 12, and transmits remote operation information to the vehicle controller device 20 of the vehicle 12 so as to control the vehicle 12.

Figure 7:
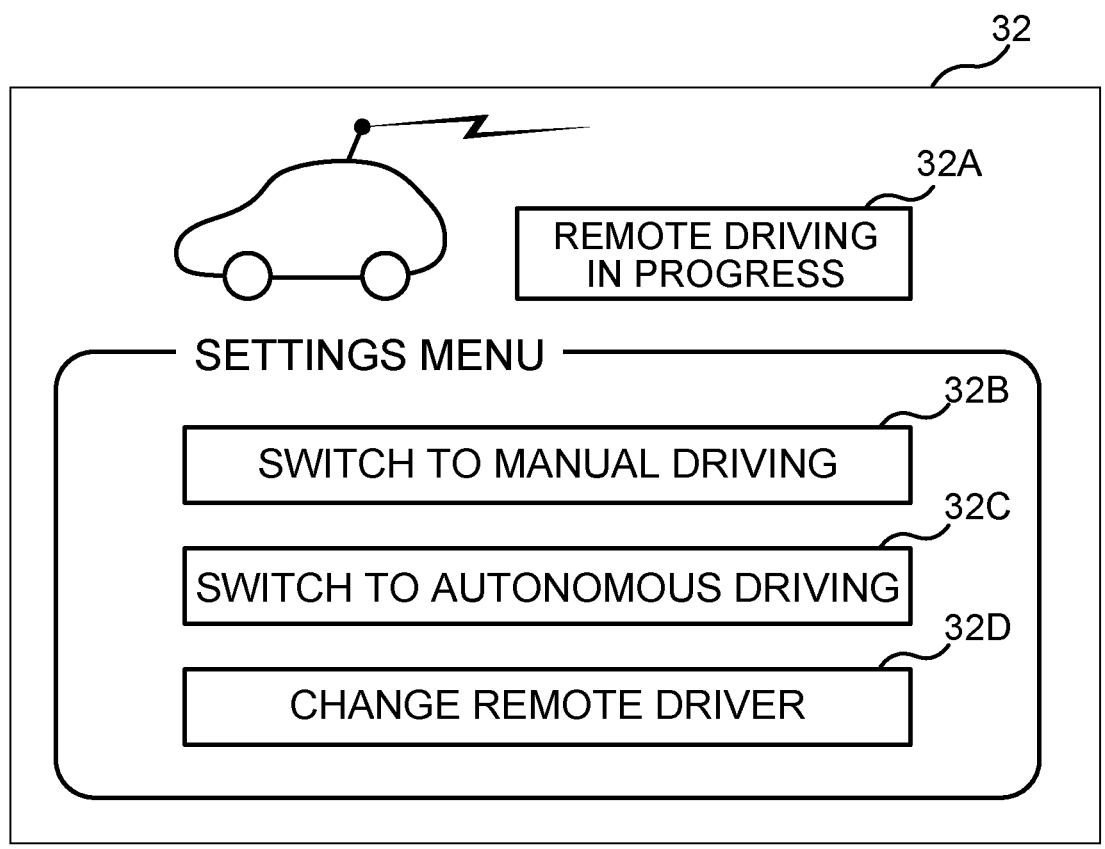
FIG. 7 illustrates an example of a touch panel display in the first exemplary embodiment.

At step S12, the CPU 20A of the vehicle 12 may transmit change instruction information to the remote operation station 14. Transmission of change instruction information corresponds to a case in which an occupant operates the icon 32D displaying "CHANGE REMOTE DRIVER" on the touch panel 32 as illustrated in FIG. 7.

At step S13 in FIG. 6, the CPU 40A of the remote controller device 40 of the remote operation station 14 executes determination processing. This determination processing will be described in detail later.

In cases in which the CPU 40A decides to transfer operation authority to another remote driver in the determination processing of step S13, at step S14 the CPU 40A of the remote controller device 40 of the remote operation station 14 transmits an authority transfer command to the remote operation station 16 to transfer operation authority of the vehicle 12. At the same time, at step S15 the CPU 40A of the remote operation station 14 transmits a transfer notification command to the vehicle 12 to notify of the operation authority transfer.

At step S16, the CPU 40A of the remote controller device 40 of the remote operation station 14 executes end processing to end processing relating to remote driving. At the same time, at step S17 the CPU 40A of the remote controller device 40 of the remote operation station 16 executes switching processing. At the same time, at step S18 the CPU 20A of the vehicle controller device 20 of the vehicle 12 executes switching processing. Switching from remote driving by the remote operation station 14 to remote driving by the remote operation station 16 is executed by the processing by the respective devices.

At step S19, the CPU 20A of the vehicle controller device 20 of the vehicle 12 starts remote driving by the remote operation station 16. At the same time, at step S20 the CPU 40A of the remote controller device 40 of the remote operation station 16 starts remote operation. Namely, the remote operation station 16 receives images captured by the camera 24A and vehicle information from the internal sensors 26 from the vehicle 12, and transmits remote operation information to the vehicle controller device 20 of the vehicle 12 so as to control the vehicle 12.

In cases in which the CPU 40A decides to hand back operation authority to the vehicle 12 in the determination processing of step S13, at step S21 the CPU 40A of the remote controller device 40 of the remote operation station 14 transmits an authority transfer command to the vehicle controller device 20 to hand back operation authority.

At step S22, the CPU 40A of the remote controller device 40 of the remote operation station 14 executes end processing to end processing relating to remote driving. At the same time, at step S23 the CPU 20A of the vehicle controller device 20 of the vehicle 12 executes switching processing. Switching from remote driving by the remote operation station 14 to autonomous driving by the vehicle controller device 20 is executed by the processing of the respective devices.

At step S24 the CPU 20A of the vehicle 12 executes autonomous driving.

Figure 8:
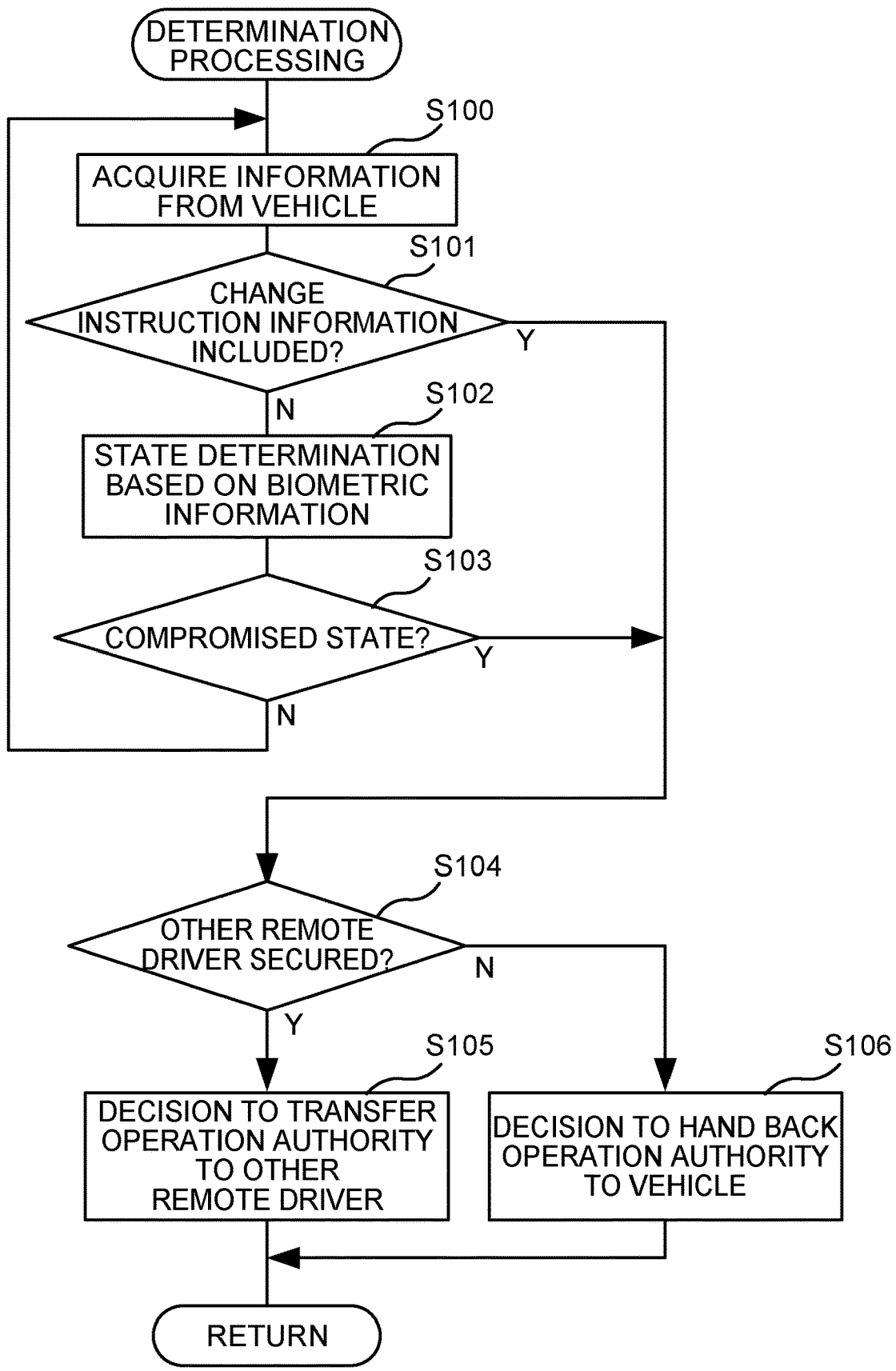
FIG. 8 is a flowchart to explain a flow of determination processing in the first exemplary embodiment.

Next, explanation follows regarding the determination processing executed by the remote controller device 40 of the remote operation station 14, with reference to the flowchart of FIG. 8.

At step S100 in FIG. 8, the CPU 40A acquires information from the vehicle controller device 20 of the vehicle 12. The acquired information includes images captured by the camera 24A, vehicle information from the internal sensors 26, and also change instruction information instructing a remote driver change.

At step S101, the CPU 40A determines whether or not change instruction information is included in the acquired information. Processing proceeds to step S104 in cases in which the CPU 40A determines that change instruction information is included in the acquired information. Processing proceeds to step S102 in cases in which the CPU 40A determines that change instruction information is not included in the acquired information.

At step S102, the CPU 40A executes state determination to determine whether or not a compromised state in which remote operation by the remote driver of the remote operation station 14 is comprised has arisen based on the biometric information regarding the remote driver acquired from the biometric sensor 49. This state determination will be described in detail later.

At step S103, the CPU 40A determines whether or not the result of the state determination is that the remote driver of the remote operation station 14 is in a compromised state. Processing proceeds to step S104 in cases in which the CPU 40A determines that the remote driver of the remote operation station 14 is in a compromised state. Processing returns to step S100 in cases in which the CPU 40A determines the remote driver of the remote operation station 14 is not in a compromised state.

At step S104, the CPU 40A determines whether or not another remote driver (the remote driver of the remote operation station 16 in the present exemplary embodiment) has been secured. Processing proceeds to step S105 in cases in which the CPU 40A determines that another remote driver has been secured. Processing proceeds to step S106 in cases in which the CPU 40A determines that another remote driver has not been secured.

At step S105, the CPU 40A decides to transfer operation authority to the other remote driver. The determination processing is then ended and processing proceeds to step S14 in FIG. 6.

At step S106, the CPU 40A decides to hand back operation authority to the vehicle 12. The determination processing is then ended and processing proceeds to step S21 in FIG. 6.

Summary of First Exemplary Embodiment

The vehicle 12 of the present exemplary embodiment is configured so as to enable manual driving by the occupant using the vehicle controller device 20, autonomous driving in which the vehicle 12 travels by being self-driven, and remote driving by a remote driver. The remote operation stations 14 and 16 enable the corresponding remote controller device 40 to receive operation from a remote driver, generate remote operation information, and transmit the remote operation information to the vehicle controller device 20 to enable remote operation of the vehicle 12. When remote driving is performed, the vehicle controller device 20 confers operation authority of the vehicle 12 to the remote driver performing remote driving.

The remote controller device 40 determines whether or not the remote driver is able to perform remote driving based on the biometric information regarding the remote driver performing the remote operation. In cases in which the compromised state in which remote driving is compromised has been determined to have arisen, operation authority can be transferred to another remote driver. Remote driving of the vehicle 12 can then be executed by the other remote driver to whom operation authority has been transferred.

As described above, the present exemplary embodiment enables travel of the vehicle 12 to be continued by another remote driver in cases in which remote operation of the vehicle 12 by one remote driver has become compromised.

The remote operation stations 14 and 16 of the present exemplary embodiment hand back operation authority to the vehicle 12 in cases in which a new remote driver cannot be secured to perform remote operation when a remote driver has been determined to be in a compromised state. Accordingly, the present exemplary embodiment enables the vehicle 12 to continue traveling even in cases in which another remote driver cannot be secured, by being autonomously driven.

If the occupant feels uncomfortable with the remote operation of the remote driver at the remote operation station 14, or senses that the vehicle 12 is traveling dangerously during remote driving, the occupant can operate the icon 32D (see FIG. 7) to transmit change instruction information from the vehicle controller device 20 to the remote operation station 14. The remote controller device 40 of the remote operation station 14 that has acquired the change instruction information is capable of conferring operation authority to another remote driver, or handing back operation authority to the vehicle 12, similarly to in cases in which the compromised state has determined to have arisen in the determination processing. Namely, in the present exemplary embodiment, the occupant of the vehicle 12 that is being remotely driven is capable of changing the remote driver by operating the touch panel 32.

Second Exemplary Embodiment

In the first exemplary embodiment, the determination processing is initially executed by the remote controller device 40 of the remote operation station 14 executing remote operation. A second exemplary embodiment differs in that the determination processing is executed by the processing server 18. Explanation follows regarding differences to the first exemplary embodiment. Note that configurations equivalent to those of the first exemplary embodiment are allocated the same reference numerals, and detailed explanation thereof is omitted.

Processing Server

Figure 9:
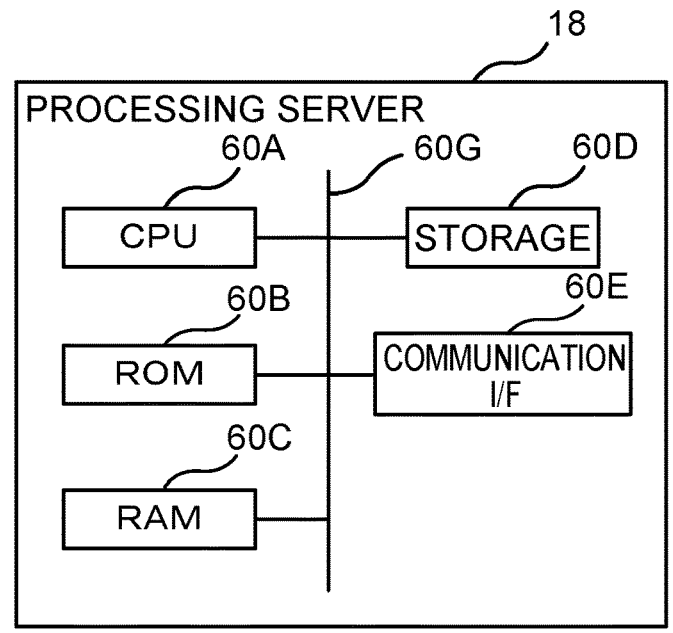
FIG. 9 is a block diagram illustrating hardware configuration of a processing server of a second exemplary embodiment.

As illustrated in FIG. 9, the processing server 18 is configured including a CPU 60A, ROM 60B, RAM 60C, storage 60D, and a communication OF 60E. The CPU 60A, the ROM 60B, the RAM 60C, the storage 60D, and the communication OF 60E are connected together so as to be capable of communicating with each other through a bus 60G Functionality of the CPU 60A, the ROM 60B, the RAM 60C, the storage 60D, and the communication OF 60E matches that of the CPU 20A, the ROM 20B, the RAM 20C, the storage 20D, and the communication OF 20E of the vehicle controller device 20 previously described. The CPU 60A is an example of a processor, and the RAM 60C is an example of memory The CPU 60A reads a program from the ROM 60B or the storage 60D, and executes the program, using the RAM 60C as a workspace. In the present exemplary embodiment, an information processing program is stored in the storage 60D. By executing the information processing program, the CPU 60A functions as an external information acquisition section 600, the operation switchover section 420, the biometric information acquisition section 430, the change instruction acquisition section 440, and the state determination section 450 illustrated in FIG. 10.

Figure 10:
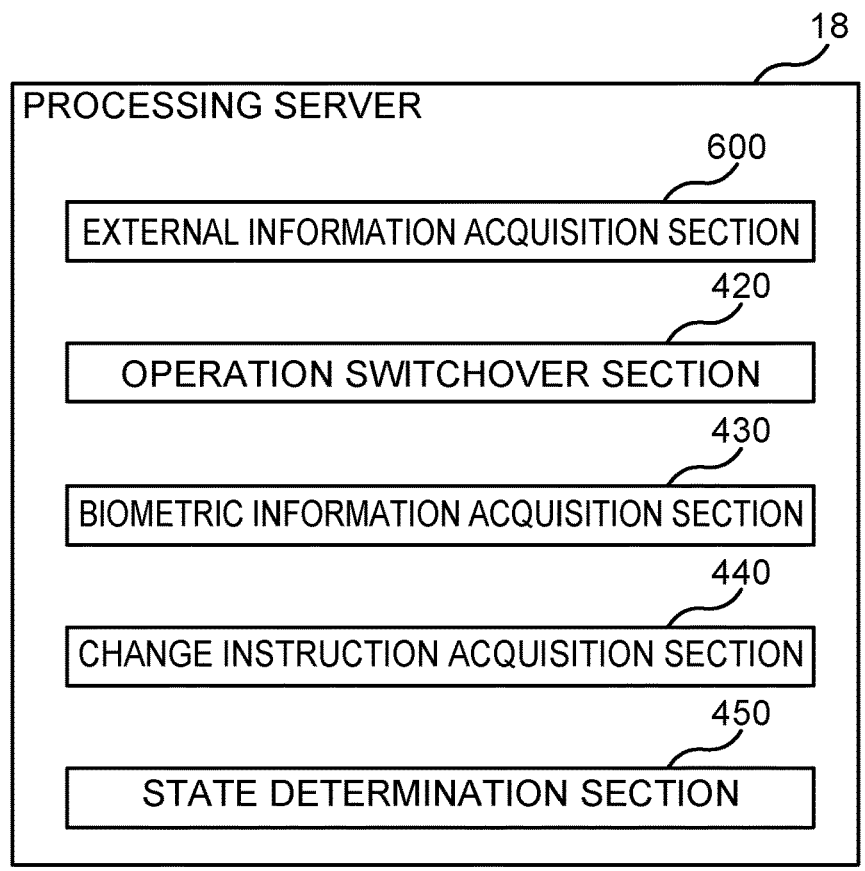
FIG. 10 is a block diagram illustrating an example of functional configuration of a processing server of the second exemplary embodiment.

FIG. 10 is a distribution illustrating an example of functional configuration of the processing server 18.

The external information acquisition section 600 includes functionality to acquire various information from sources external to the processing server 18. The acquired information includes authority transfer commands transmitted from the vehicle controller device 20 of the vehicle 12, and also biometric information and authority transfer commands transmitted from the respective remote controller devices 40.

The operation switchover section 420, the biometric information acquisition section 430, the change instruction acquisition section 440, and the state determination section 450 have the functionality previously described.

Figure 11:
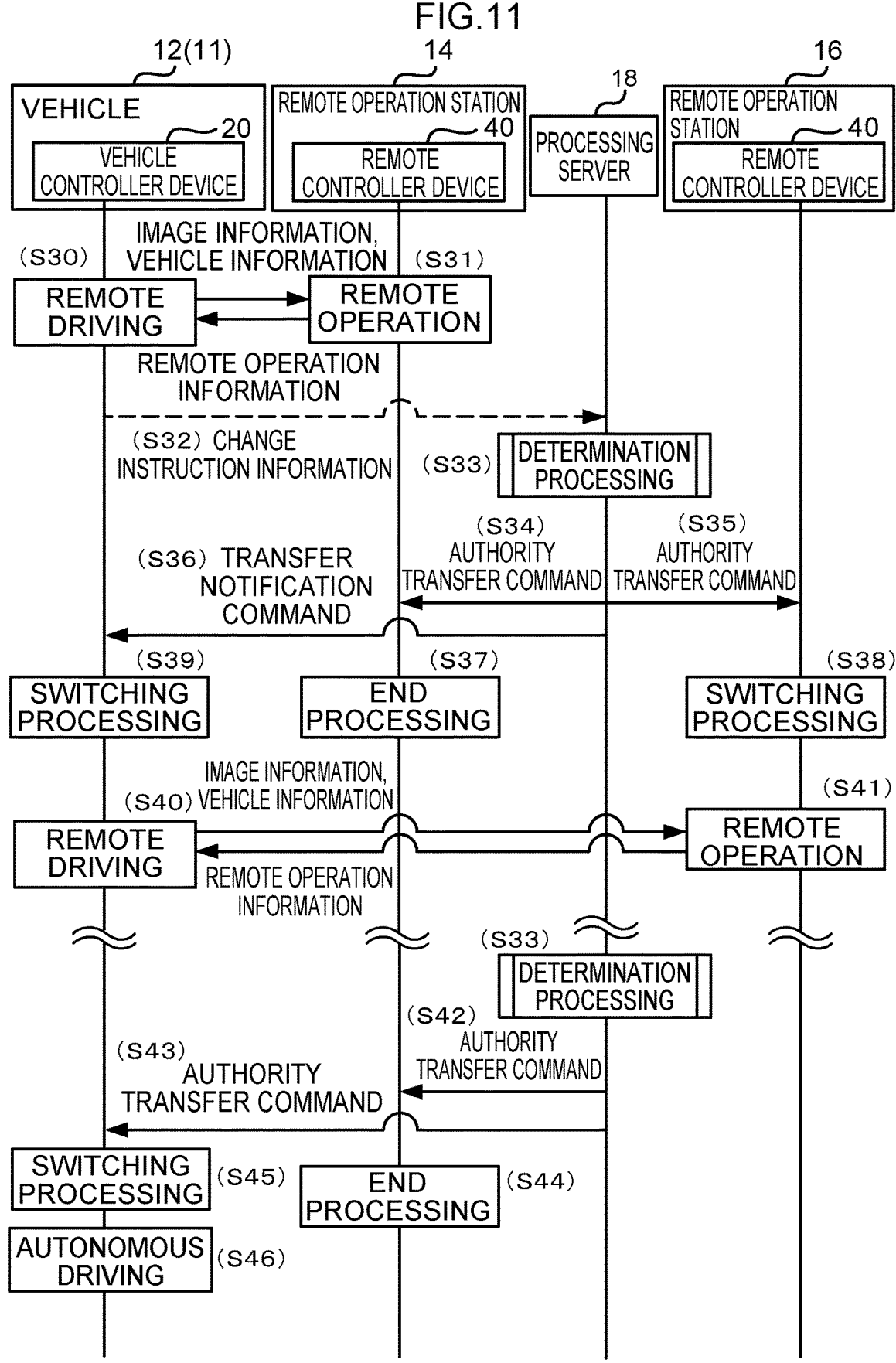
FIG. 11 is a sequence diagram illustrating a flow of processing between respective devices in the second exemplary embodiment.

Explanation follows regarding a flow of processing between the respective devices of the present exemplary embodiment, with reference to the sequence diagram of FIG. 11.

The processing of step S30 and step S31 in FIG. 11 the same as that of step S10 and step S11 in FIG. 6.

At step S32, the CPU 20A of the vehicle 12 may transmit change instruction information to the processing server 18. Transmission of change instruction information corresponds to a case in which an occupant operates the icon 32D illustrated in FIG. 7 as previously described.

At step S33 in FIG. 11, the CPU 60A of the processing server 18 executes determination processing. In cases in which the CPU 60A decides to transfer operation authority to another remote driver in the determination processing at step S33, at step S34 the CPU 60A of the processing server 18 transmits an authority transfer command to the remote operation station 14 to transfer operation authority. At step S35, the CPU 60A of the processing server 18 transmits an authority transfer command to the remote operation station 16 to transfer operation authority. Then at step S36, the CPU 60A of the processing server 18 transmits a transfer notification command to the vehicle 12 to notify of the transfer of operation authority.

At step S37, the CPU 40A of the remote operation station 14 executes end processing to end processing relating to remote driving. At the same time, at step S38, the CPU 40A of the remote operation station 16 executes switching processing. Also at the same time, at step S39 the CPU 20A of the vehicle 12 executes switching processing. Switching from remote driving by the remote operation station 14 to remote driving by the remote operation station 16 is executed by the processing of the respective devices.

The processing of step S40 and step S41 in FIG. 11 is the same as that of step S19 and step S20 in FIG. 6.

In cases in which the CPU 60A decides to hand back operation authority to the vehicle 12 in the determination processing of step S33, at step S42 the CPU 60A of the processing server 18 transmits an authority transfer command to the remote operation station 14 to transfer operation authority. Then at step S43 the CPU 60A of the processing server 18 transmits an authority transfer command to the vehicle controller device 20 to hand back operation authority.

At step S44, the CPU 40A of the remote operation station 14 executes end processing to end processing relating to remote driving. At the same time, at step S45 the CPU 20A of the vehicle 12 executes switching processing. Switching from remote driving by the remote operation station 14 to autonomous driving by the vehicle controller device 20 is executed by the processing of the respective devices.

At step S46, the CPU 20A of the vehicle 12 executes autonomous driving.

Summary of Second Exemplary Embodiment

Although determination processing is executed by the processing server 18 in the second exemplary embodiment, this configuration exhibits similar operation and advantageous effects to the first exemplary embodiment. Moreover, in the present exemplary embodiment, connecting multiple remote operation stations (namely remote controller devices 40) to the processing server 18 enables remote drivers to be secured to remotely operate even more vehicles 12.

Remarks

Although the exemplary embodiments described above employ examples in which a remote driver who manipulates the vehicle 12 as remote operation serves as a remote operator, there is no limitation thereto, and the remote operator may be an operator who gives instructions regarding the course, speed, and the like of the vehicle 12 as remote operation.

Although the exemplary embodiments described above employ examples in which biometric information is acquired by the biometric sensor 49 in each of the remote operation stations 14 and 16, there is no limitation thereto, and biometric information may be acquired using the input devices 48. For example, steering force input to the steering wheel 48A may be acquired as biometric information. In such cases, the state determination section 450 serving as a determination section determines whether or not the compromised state in which operation of the vehicle 12 by the remote operator is comprised has arisen based on operation information.

Note that the various processing executed by the CPU 20A reading software (a program), the various processing executed by the CPU 40A reading software (a program), and the various processing executed by the CPU 60A reading software (a program) in the exemplary embodiments described above may be executed by various processors other than CPUs. Examples of such processors include programmable logic devices (PLDs) such as field-programmable gate arrays (FPGAs) that have a circuit configuration that can be modified following manufacture, or dedicated electrical circuits, these being processors such as application specific integrated circuits (ASICs) that have a custom designed circuit configuration to execute specific processing. The various processing may be executed using one of these processors, or may be executed by a combination of two or more processors of the same type or different types to each other (for example a combination of plural FPGAs, or a combination of a CPU and an FPGA). A more specific example of a hardware structure of these various processors is electric circuitry combining circuit elements such as semiconductor elements.

The exemplary embodiments described above describe a format in which the programs are stored (installed) in advance on a non-transient computer-readable recording medium. For example, the execution program employed by the vehicle controller device 20 of the vehicle 12 is stored in advance in the ROM 20B. The processing program employed by the remote controller device 40 of the remote operation station 14 or 16 is stored in advance in the ROM 40B. The information processing program employed by the processing server 18 is stored in advance in the ROM 60B. However, there is no limitation thereto, and the respective programs may be provided in a format recorded on a non-transient recording medium such as compact disc read only memory (CD-ROM), digital versatile disc read only memory (DVD-ROM), or universal serial bus (USB) memory. Alternatively, the respective programs may be configured in a format to be downloaded from an external device through a network.

The flows of processing in the exemplary embodiments described above are given as examples, and unnecessary steps may be omitted, new steps added, and the processing sequence rearranged within a range not departing from the spirit of the present disclosure.

What is claimed is:

1. An operation device comprising:
   a memory; and
   a processor coupled to the memory, the processor being configured to:

receive operation by a remote operator conferred with operation authority to operate a vehicle configured for autonomous driving;

transmit, to the vehicle, operation information for remote driving based on the received operations;

wherein the processor is configured to acquire change instruction information in which an occupant of the vehicle instructs a change in remote operator, (I) in a case in which the processor does not acquire the change instruction information, the processor being configured to:

acquire biometric information regarding the remote operator, determine whether or not a compromised state, in which operation of the vehicle by the remote operator is compromised, has arisen based on the acquired biometric information or based on the operation information instead of the acquired biometric information, and then determine whether or not there is another remote operator available for remote driving, and (i) transfer operation authority of the vehicle to another remote operator in a case in which the compromised state has been determined to have arisen and there is another remote operator, (ii) hand back operation authority of the vehicle to the vehicle in a case in which the compromised state has been determined to have arisen and there is not another remote operator, (II) in a case in which the processor acquires the change instruction information, the processor being configured to:

determine whether or not there is another remote operator without determining whether or not the compromised state has arisen, (iii) transfer operation authority of the vehicle to another remote operator, in a case in which there is another remote operator, and (iv) hand back operation authority of the vehicle to the vehicle in a case in which there is not another remote operator.

2. A vehicle control system comprising:

a plurality of operation devices, each of the plurality of operation devices comprising:

a memory; and a processor coupled to the memory, the processor being configured to:

receive operation by a remote operator conferred with operation authority to operate a vehicle configured for autonomous driving;

transmit, to the vehicle, operation information for remote driving based on the received operations;

wherein the processor is configured to acquire change instruction information in which an occupant of the vehicle instructs a change in remote operator, (I) in a case in which the processor does not acquire the change instruction information, the processor being configured to:

acquire biometric information regarding the remote operator, determine whether or not a compromised state, in which operation of the vehicle by the remote operator is compromised, has arisen based on the acquired biometric information or based on the operation information instead of the acquired biometric information, and then determine whether or not there is another remote operator available for remote driving, and (i) transfer operation authority of the vehicle to another remote operator in a case in which the compromised state has been determined to have arisen and there is another remote operator, (ii) hand back operation authority of the vehicle to the vehicle in a case in which the compromised state has been determined to have arisen and there is not another remote operator, (II) in a case in which the processor acquires the change instruction information, the processor being configured to:

determine whether or not there is another remote operator without determining whether or not the compromised state has arisen, (iii) transfer operation authority of the vehicle to another remote operator, in a case in which there is another remote operator, and (iv) hand back operation authority of the vehicle to the vehicle in a case in which there is not another remote operator;

the system further comprises the vehicle, the vehicle being configured to be remotely driven based on operation information received from one of the plurality of operation devices, wherein:

when the processor has transferred operation authority to the another remote operator, the vehicle executes remote driving based on operation information received from an operation device operated by the another remote operator, and when the processor has handed back operation authority to the vehicle, the vehicle switches from executing remote driving to executing autonomous driving.

3. A vehicle control system comprising:

a plurality of operation devices configured to remotely operate a vehicle that is configured for autonomous driving;

the vehicle, the vehicle being configured to be remotely driven based on operation information received from one of the plurality of operation devices; and a server connected to the plurality of operation devices and to the vehicle, the server configured to communicate with the plurality of operation devices and the vehicle, wherein:

each of the plurality of operation devices includes a memory and processor, the processor programmed to:

receive operation by a remote operator conferred with operation authority to operate the vehicle configured for autonomous driving, and transmit, to the vehicle, operation information for remote driving based on the received operations; and the server includes:

a memory; and a server processor coupled to the memory, the server processor being configured to:

acquire change instruction information in which an occupant of the vehicle instructs a change in remote operator, (I) in a case in which the server processor does not acquire the change instruction information, the server processor being configured to:

acquire biometric information regarding the remote operator, determine whether or not a compromised state, in which operation of the vehicle by the remote operator is compromised, has arisen based on the acquired biometric information or based on the operation information instead of the acquired biometric information, and then determine whether or not there is another remote operator available for remote driving, and (i) transfer operation authority of the vehicle to another remote operator in a case in which the compromised state has been determined to have arisen and there is another remote operator, (ii) hand back operation authority of the vehicle to the vehicle in a case in which the compromised state has been determined to have arisen and there is not another remote operator, (II) in a case in which the server processor acquires the change instruction information, the server processor being configured to:

determine whether or not there is another remote operator without determining whether or not the compromised state has arisen, (iii) transfer operation authority of the vehicle to another remote operator, in a case in which there is another remote operator, and (iv) hand back operation authority of the vehicle to the vehicle in a case in which there is not another remote operator.

* * * * *